United States Patent [19]
Cullen

[11] 3,938,338
[45] Feb. 17, 1976

[54] COVERING OR BLANKETING LIQUID SURFACES AND FLOAT MEMBERS FOR EFFECTING SAME

[76] Inventor: Arthur Prosper Cullen, 1 Cavendish Drive, Claygate, Surrey, England

[22] Filed: Nov. 11, 1974

[21] Appl. No.: 522,783

[30]  Foreign Application Priority Data
     Nov. 9, 1973   United Kingdom............... 52177/73

[52] U.S. Cl............................. 61/1 R; 61/.5; 61/5;
                                          4/172; 220/380
[51] Int. Cl.² ........................................... E02B 3/00
[58] Field of Search................. 61/1, .5, 5; 114/.5 F;
                                  4/172, 172.12; 220/380; 46/24

[56]           References Cited
           UNITED STATES PATENTS
3,340,553   9/1967   Jones.................................. 114/.5 F
3,842,768  10/1974   Maistre............................... 114/.5 F FOREIGN PATENTS OR APPLICATIONS
13,780   6/1928   United Kingdom............... 4/172.12

Primary Examiner—Jacob Shapiro
Attorney, Agent, or Firm—Shoemaker and Mattare, Ltd.

[57]           ABSTRACT

The invention provides a float member for use in conjunction with similar float members for substantially completely blanketing or covering the surface of a liquid to reduce evaporation, and/or to suppress waves, the emission of noxious or toxic fumes and the formation of foam. The float member comprises a body having a hexagonal circumferential skirt or wall at least 0.2 inches (5mm) in depth and is so shaped and/or weighted that it tends to flaot in only one of two dispositions with its hexagonal skirt disposed at the level of the liquid with such skirt extending substantially at right angles to the surface of the liquid.

16 Claims, 7 Drawing Figures

COVERING OR BLANKETING LIQUID SURFACES AND FLOAT MEMBERS FOR EFFECTING SAME

This invention relates to blanketing of liquid surfaces and in particular both to the thermal insulation of liquids and to the provision of a blanketing cover to the surfaces of liquids to reduce evaporation; the suppression of waves; the emission of noxious or toxic fumes and the formation of foam.

It is known that the aforementioned conditions and occurrences at the surface of a liquid can be reduced by floating insulating members on the surface, the number of insulating members being such that the major part and preferably substantially the whole of the surface is occupied.

More particularly it is known to employ for this purpose, floats which consist of spheres of usually synthetic plastics material, often air-filled, and of, say, one-to-four inches in diameter.

Such hollow spheres have been successfully used as such floating insulating members for reducing heat loss at the surfaces of vats, swimming pools, water filtration tanks and sewage lakes.

However, particularly in the case of open-air installations the use of light weight hollow spheres as floating insulating members presents difficulties. The light weight of the floats renders them easily damaged or blown from the surface of the liquid by wind involving their continual loss and need for replacement. Moreover, such floating spheres, when floating in contact with one another, can only incompletely blanket the total liquid surface area, precisely because of their spherical shape.

Spherical insulating floats readily revolve and dust and dirt deposited on the top of the floats is passed into the liquid when they revolve. By continuously revolving and exposing a freshly wetted surface greater liquid evaporation takes place than if the floats did not turn.

According to this invention, there is provided a float member for use in conjunction with similar members, i.e. side-by-side nesting relationship, for substantially completely blanketing or covering the surface of a liquid, for the various objects aforementioned, the member comprising a body provided with a peripheral or circumferential skirt or wall of hexagonal shape and at least 0.2 inches (5 mm) in depth, the body being so constructed, that is by being so shaped and/or weighted, that it tends to float in only one of two dispositions with its hexagonal skirt disposed at the level of the liquid surface with such skirt extending substantially at right angles to the surface of the liquid.

Preferably, the float body is formed in one piece by injection moulding, advantageously of polypropylene in the shape of a registering pair of protuberant elements between which at their common base is formed the hexagonal skirt or wall whose walls are parallel with the transverse axis of the hexagonal skirt. The protuberances have sloping sides whereby the effect of wind pressure from any direction is to depress the float into the liquid and to inhibit neighbouring floats from riding one upon another.

Alternatively, the float may have a flat top and bottom bounded by the hexagonal skirt.

In this case the depth of the skirt will be at least 12.5% and preferably not more than 40% of the maximum dimension across the hexagonal configuration of the skirt of the float member.

In the case of a float member according to the invention having a hexagonal skirt located between a registering pair of protuberant elements having sloping sides, the depth of the hexagonal skirt is at least one eighth, and preferably at least one quarter of the total thickness of the float along the axis of the hexagonal skirt and, also, the depth of the skirt is preferably at least 12.5% and preferably not more than 40% of the maximum dimension across its hexagonal configuration.

When the hexagonal skirt is located between opposed integral elements each of identical protuberant shape, this shape may be one of:

a. a pyramid;
b. a pyramidic frustum;
c. a cone;
d. a conical frustum;
e. a convex segment;
f. a part-spherical segment.

All the shapes (a – f) above will terminate at the skirt in a hexagonal base. All will present sloping sides terminating at their base.

In all cases of the shapes (a – f) above there may be flattening or other shaping at the apex depending on the manufacturing process, that is at the maximum thickness of the float measured along the axis of the peripheral hexagonal skirt.

The sloping sides may be of straight, convex or re-entrant configuration.

When the required number of floats provided with such hexagonal skirts or walls are assembled on the surface of a body of fluid there need be little or no space between one float and its neighbours. This arrangement thus obviates the gaps which are inevitably present in an array of contiguous spherical floats or contiguous floats having skirts which are other than hexagonal, rectangular or triangular in plan view.

This floating body may be formed of moulded polypropylene and may have a smooth or solid exterior skin while its interior is advantageously of foam composition.

The skirt or wall preferably has a minimum depth of 0.25 inches (6.5 mm) when the body has an overall size, measured across the skirt or wall, of 1.5 inches.

However, the depth of the skirt is always at least one eighth of, and preferably one quarter of the overall size of the float measured across the largest dimension of the skirt.

The float may alternatively be formed in two sections each of protuberant or concave pyramidic, hemispherical, conical, oval or other convenient form. Each section has a continuous or endless outwardly extending lip at its widest section and two such sections are joined with their lips in register to form the peripheral or circumferential hexagonal skirt. Prior to uniting the two sections one or both of them may be weighted either by introducing, or by attaching a plastics, metal or other substance of appropriate density.

Four embodiments of floating body according to the invention are shown by way of example with reference to the accompanying drawings, in which:

FIG. 1 is a side view and FIG. 2 a plan view of a hexagonal float having a hexagonal peripheral skirt intended to be floated on a liquid whose surface level is indicated as S in FIG. 1. The embodiment depicted in FIGS. 1 and 2 having flat top and bottom surfaces are only suitable for still surface conditions, that is, without any turbulence being occasioned in the liquid. Preferred embodiments of the hexagonal float according to the invention are illustrated in FIGS. 3 to 7; in these:

FIGS. 3 and 4 show in side view and plan view respectively a float member according to a preferred embodiment of the invention; while

Figure 1:
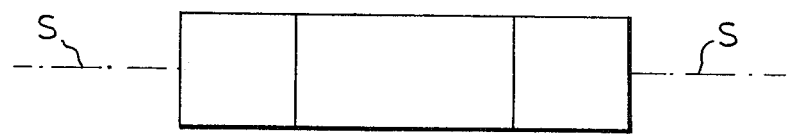
Figure 2:
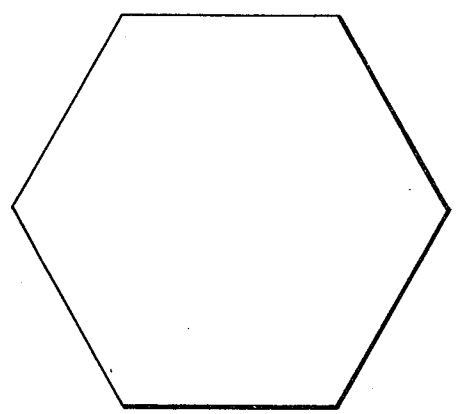

Referring now to the drawings, FIGS. 1 and 2 depict a float member for use in conjunction with similar members for substantially completely covering or blanketing the surface of a liquid for the purpose stated at the outset of this specification.

The float member comprises a body having a circumferential skirt of hexagonal shape and of at least 0.2 inches (or at least 5 mm) depth with a typical overall maximum dimension of 1.5 inches.

The body has a flat top and a flat bottom and has such density in relation to the density of the liquid in which it is intended to be floated that it can float in one of two dispositions with its skirt at the level of the liquid surface as indicated at S.

The floating body is manufactured of synthetic plastics material using the materials and techniques aforementioned. For example, it is of injection moulded polypropylene and may have a smooth or solid exterior skin and with an interior of foam construction.

The depth of the hexagonal skirt in relation to the overall dimension of the hexagonal shape of the float is at least 1 : 8 and preferably 1 : 4.

The embodiment depicted in FIGS. 1 and 2 having flat top and bottom surfaces is only suitable for still surface conditions, that is, without any turbulence being occasioned in the liquid.

The embodiments of FIGS. 3 and 4, and 5 and 6, and 7 respectively, are preferred and basically similar, being based on opposed protuberant elements integral with the hexagonal skirt. Each have a sloping top and bottom between which is the hexagonal peripheral skirt at their widest dimension.

Such skirt is of at least 0.2 inches (or at least 5 mm) in depth.

The body is so constructed, that is by being so shaped and/or weighted that it tends to float in one of only two alternative dispositions in the liquid for which it is intended.

The angle alpha (FIGS. 3 and 5) is between 110° and 160°, or in other words, the sloping sides define an angle with the horizontal of less than about 45°, so that in the event of the hexagonal floats being subjected to the effects of wind or waves, firstly the effect is that the float tends to be depressed into the liquid in which it is floating and secondly, the stacking of neighbouring floats one upon another is inhibited, since the floats' actual shape tends to make them slide off one another when stacking occurs.

Part of the float may be of metal or plastics so as to obtain the required density so that the float may be submerged in the liquid such that its hexagonal skirt is disposed at the level of the liquid surface.

Figure 3:
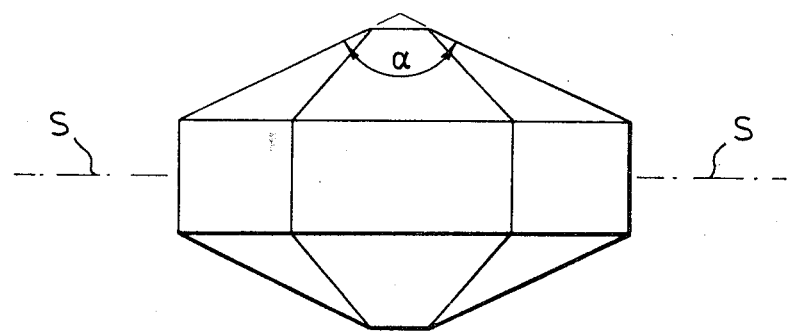
Figure 4:
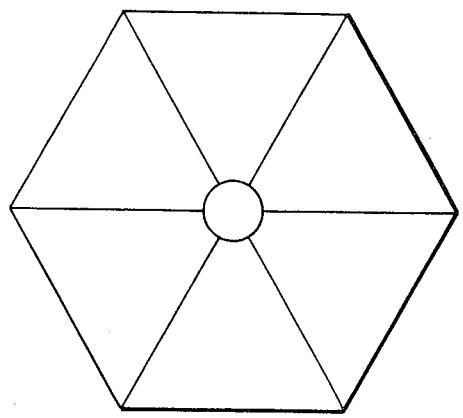

In FIGS. 3 and 4 the hexagonal skirt is located between opposed pyramidic frusta having hexagonal bases and flattened at their apices.

Figure 5:
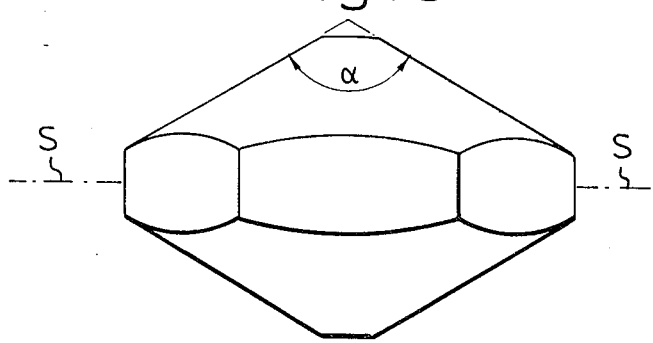
FIGS. 5 and 6 show an alternative version of the float member according to the invention, again in side and plan view respectively.
Figure 6:
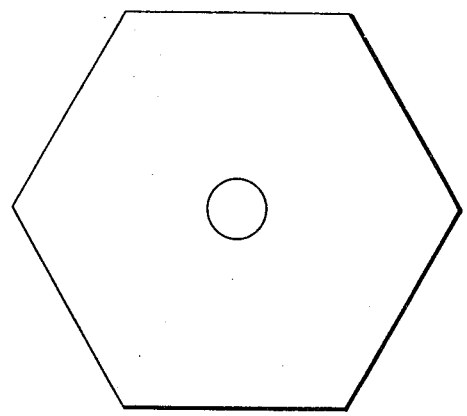

In FIGS. 5 and 6 the hexagonal skirt is located between opposed conical frusta having hexagonal bases and flattened at their apices.

Figure 7:
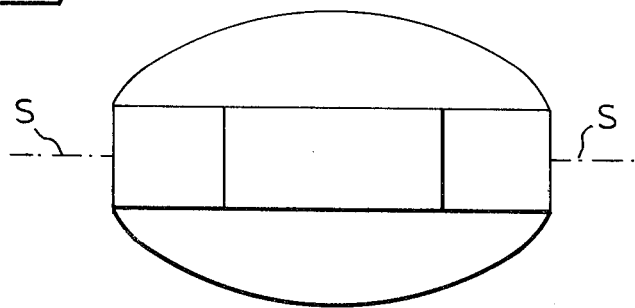
FIG. 7 is a side view of a float having upper and lower curved surfaces.

In FIG. 7 the hexagonal skirt is located between part spherical integral top/bottom convex body members integral with the skirt.

Preferably the angle alpha in FIGS. 3 and 5 is 125° ±5°.

In order to verify the performance of the hexagonal floats according to the invention, a series of tests was conducted using a 4 × 1 × 1 foot glass-sided tank filled with water and suitably lagged and instrumented so that the floats according to the invention and as depicted in FIGS. 3 and 4 could be thermally tested with the number of floats being sufficient that when floating, a complete cover was formed on the water surface in the tank.

PARAMETERS AVAILABLE FOR INVESTIGATION

1. Effect of the hexagonal floats on the waves produced.
2. Power input to the tank with and without the floats.
3. The temperatures maintained with (2).
4. Effect of waves with (2) and (3).
5. Effects of known wind velocities across the surface of the tank with (2), (3) and (4).

MEASUREMENTS TO BE TAKEN WITH EACH TEST

1. A visual observation with estimated height of swell.
2. Power input to the tank immersion heaters measured by Wattmeter.
3. Mercury in glass thermometers placed with at least 2½ inches of the stem immersed beneath the surface. A Bechmann thermometer is used to check against any sudden large changes in tank temperature.
4, 5. Power inputs were recorded over a period of time to maintain a steady tank temperature with and without floats.

Test 1

A wave paddle was switched on and with the paddle rotating at 75 rev/min a mean wave height of 1 inches at a pitch of 2 inches was produced. By introducing enough floats as depicted in FIGS. 3 and 4 to cover the water surface remote from the paddle (an area of approximately 3 × 1) the movement of the water surface changed completely to that of a gentle swell ¼ — ⅜ inches high at a pitch of 10 inches.

The damping effect of the hexagonal floats was quite remarkable and appeared to have the same effect as a thick coating of oil. The interlocking of the hexagonal floats was good and appeared in sections 8 inches — 10 inches long on the surface. More severe waves tended to make interlocking more complete.

Tests 2 and 3

Preliminary thermal tests including wave making showed an electrical input of 200 watts with the tank water surface exposed and maintained at a temperature of 100°F. The ambient temperature was recorded at 71°F. The inclusion of the floats as depicted in FIGS. 3 and 4 at approximately 92 per sq. ft. and covering 3 sq. ft. of water surface reduced the electrical input to approximately 75 watts. This represents a saving of 62.5%. The validity of this test was checked by removing the floats and allowing the heat input to rise to maintain the original tank temperature of 100°F - the electrical input was recorded at 200 watts. If it is considered that since the operating temperatures of, as an example, a swimming pool, may vary from 70°–90°F (UK-USA) a mean temperature of approximately 80°F would be suitable for this particular application. However, with a laboratory ambient temperature of approximately 70°F this would be too small a temperature difference with which to formulate reliable heat transfer data. In view of this a more accurate wattmeter was introduced and a water temperature of 85°F was agreed for further tests.

It was also concluded at this point that since the movement of the water surface due to the wave making was slight when the floats were in use, the wave generating paddle could be dispensed with and the whole tank surface could be filled with floats so that the static heat transfer problem could be studied.

It was also decided at this point in an attempt to simulate actual operating conditions to proceed with mounting a suitable fan on the tank so that the effect of wind on the hexagonal floats and also on the heat transfer could be investigated. The results are shown in Table A.

At this time a test rig was used to do a comparative thermal test comparing the floats according to the invention as depicted in FIGS. 3 and 4, with hollow spherical balls of 1.5 inches in diameter and the results are as shown in Table B.

TABLE A

| Test | Ambient Temp. °F | Tank Water Temp. °F | Electrical input WATTS | Area Covered With Floats ft² | |
|------|------|------|------|------|------|
| (a) | 75 | 100 | 200 | NIL | ) Electrical ) saving |
| (b) | 75 | 100 | 75 | 3 | ) 125 watts = ) 62.5% |
| (c) | 73 | 93 | 75 | 3 | ) Wave maker ) in use |
| (d) | 68 | 84.5 | 92 | NIL | ) Electrical ) saving |
| (e) | 67.5 | 85.5 | 40 | 4 | ) 52 watts = ) 56.6% |

TABLE B

COMPARATIVE TESTS OF HEXAGONAL FLOATS AND SPHERICAL FLOATS OF 1.5 INCHES DIAMETER

| Ambient Temp. °F | Tank Water Temp. °F | Electrical input WATTS | Area Covered ft² | Wind Velocity |
|------|------|------|------|------|
| 67 | 84.5 | 37 | 4 hexagonal floats | NIL |
| 73 | 85.0 | 24 | 4 balls | NIL |
| 70 | 84.5 | 104 | 4 balls | 4 Knot (402 ft/min) |
| 67 | 84.5 | 40 | 4 hexagonal floats | NIL |
| 71 | 85.0 | 88 | 4 hexagonal floats | 4 Knot (402 ft/min) |

Since the insulating balls proved to be unstable in practice when subjected to high wind velocities it was decided to determine the actual wind speed at which they were blown from the liquid surface. This was done simply by increasing the fan speed until 'breakaway' occurred and then measuring the wind speed with an anemometer.

The breakaway speed was measured at 1160 ft/min., this corresponds to 11.5 knots. In order to compare the stability of the hexagonal floats the fan speed was again increased, with the floats in the tank, up to the working limit of the particular fan used for this test, which was 1310 ft/min (13 knots). The hexagonal floats behaved perfectly normally with no tendency at all to lift. The swell on the tank surface was observed to increase slightly. It was felt that a very large increase in wind velocity would have to be used in order to produce any tendency to 'stack' the hexagonal floats at one end of the tank.

The hexagonal floats used in the tests have proved to be successful from both stability and insulation points of view. The tests showed that even with high wind velocities the floats showed no sign of tipping over or 'stacking' at one end of the tank. Unfortunately, due to limitation of fan speed, it was not possible in the laboratory tests to determine a wind speed at which the floats would become unstable — but as already mentioned above, it is clear that this is considerably higher than the speed which made the spherical balls unstable.

It will be noticed from the results that the electrical input when using the spherical balls for approximately the same operating conditions was less than for the hexagonal floats. This was expected since the insulation characteristics of hollow balls which contain static air are good, the results indicating that for a straight insulation test hollow balls are equal or better. However, it will be noticed that when testing with a 4 knots wind, the heat input for the hexagonal floats rose from 40 to 88 watts, whereas the heat input for the spherical floats rose from 24 to 104 watts. These figures are not surprising when the effectiveness of the surface cover is observed. With the hexagonal shape of the float according to the invention comparatively only very small areas did not fully interlock, whereas spherical floats permanently left a 'triangular' shape of surface uncovered many times, this producing a very large uncovered surface area. This characteristic again emphasises the effectiveness of the hexagonal float.

Advantageously, the density of the hexagonal float according to the invention is adjusted so that the water surface is midway down the vertical section of the float in dependence upon the density of the liquid, the surface of which the float according to the invention is intended to blanket.

The tests show that the use of the hexagonal floats in for example, a swimming pool, is a sound proposal and any further use, say, in sewage farm and fish farm applications, is equally applicable. The main criteria in both of these further uses being a complete and effective coverage in fairly exposed areas where high wind velocities would be expected. Reservoir coverage to reduce evaporation would be another useful application which again uses the effectiveness of the cover.

I claim:

1. A float member, for side-by-side nesting relationship with similar float members for substantially completely blanketing or covering the surface of a liquid for reducing evaporation loss of the liquid and for reducing transfer of thermal energy between the liquid and atmosphere, the member comprising a body having a peripheral wall at its midportion of hexagonal shape and having a maximum transverse dimension of about 4.0 inches and a depth of at least about 0.2 inches, and wherein the hexagonal wall is located between opposed integral elements each of identical protuberant shape, the protuberance in each element terminating in the hexagonal wall and tapering inwardly away therefrom such that each protuberance presents sloping sides terminating at the wall, the sloping sides defining an angle to the horizontal of less than about 45° so that wind blowing across the member tends to urge it downwardly, and wherein the depth of the hexagonal wall is at least one-eighth of the total thickness of the float member measured in the direction axially of the hexagonal wall and said depth being between 12.5% and 40% of the maximum dimension across the hexagonal configuration of the float member, and said float member having a weight in relation to its size such that its hexagonal wall is disposed at the surface level of, and partially immersed in, the liquid.

2. A float member according to claim 1, wherein the depth of the hexagonal wall is at least one quarter of the total thickness of the float member measured in the direction axially of the hexagonal wall.

3. A float member according to claim 1, wherein the circumferential wall of hexagonal shape has a maximum dimension measured across the body of not more than 1.5 inches.

4. A float member according to claim 1, wherein the protuberance is flattened at its apex or at the maximum thickenss of the float member measured along the axis of the peripheral wall.

5. A float member according to claim 1, wherein the sloping sides are of straight configuration.

6. A float member according to claim 1, wherein the sloping sides are of convex configuration.

7. A float member according to claim 1, wherein the sloping sides are of re-entrant configuration.

8. A float member according to claim 1, wherein the protuberances have sloping sides which are straight, the included angle between the sides being obtuse and between 110° and 160°.

9. A float member according to claim 1, wherein the float body is formed in one piece of injection moulded polypropylene.

10. A float member according to claim 1, wherein the float body has a substantially smooth or solid exterior skin while its interior is of foam composition.

11. A float member according to claim 1, wherein the wall has a minimum depth of 0.25 inches while the body has an overall size measured across the maximum dimension of its wall of not more than 1.5 inches.

12. A float member according to claim 1, wherein the float is formed in two sections each of protuberant shape, each section having a continuous or endless outwardly extending hexagonal lip at its widest section with the two such sections being joined with their lips in register to form the peripheral or circumferential hexagonal wall.

13. A float member according to claim 12, wherein the protuberant shape is pyramidic.

14. A float member according to claim 12, wherein the protuberant shape is hemispherical.

15. A float member according to claim 12, wherein the protuberant shape is conical.

16. A float member according to claim 12, wherein the protuberant shape is curved convex.

* * * * *